US012333573B2

(12) United States Patent
Agoren

(10) Patent No.: US 12,333,573 B2
(45) Date of Patent: *Jun. 17, 2025

(54) METHODS, SYSTEMS, AND MEDIA FOR ENHANCING A BLIND URL ESCROW WITH REAL TIME BIDDING EXCHANGES

(71) Applicant: Integral Ad Science, Inc., New York, NY (US)

(72) Inventor: Izzet Agoren, Jersey City, NJ (US)

(73) Assignee: Integral Ad Science, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/587,361

(22) Filed: Feb. 26, 2024

(65) Prior Publication Data

US 2024/0202781 A1    Jun. 20, 2024

Related U.S. Application Data

(63) Continuation of application No. 17/526,367, filed on Nov. 15, 2021, now Pat. No. 11,915,272, which is a
(Continued)

(51) Int. Cl.
*G06Q 30/0273*    (2023.01)
*G06Q 30/0241*    (2023.01)

(52) U.S. Cl.
CPC ..... *G06Q 30/0275* (2013.01); *G06Q 30/0248* (2013.01)

(58) Field of Classification Search
None
See application file for complete search history.

(56) References Cited

U.S. PATENT DOCUMENTS

2007/0214045 A1\*   9/2007  Subramanian .......... G06Q 30/08
                                                          705/14.69
2011/0047006 A1     2/2011  Attenberg et al.
(Continued)

OTHER PUBLICATIONS

T. R. Srinath, S. Kella and M. Jenamani, "A New Secure Protocol for Multi-attribute Multi-round E-reverse Auction Using Online Trusted Third Party," 2011 Second International Conference on Emerging Applications of Information Technology, Kolkata, India, 2011, pp. 149-152, doi: 10.1109/EAIT.2011.83. (Year: 2011).\*
(Continued)

*Primary Examiner* — Katherine Kolosowski-Gager
(74) *Attorney, Agent, or Firm* — Byrne Poh LLP

(57) ABSTRACT

Methods, systems, and media for enhancing a blind URL escrow with real-time bidding exchanges are provided. In some embodiments, the method comprises: receiving, using a hardware processor, a URL associated with an advertisement placement from a seller, generating a rating for the URL received from the seller; determining metadata based on the URL and a domain name associated with the seller, generating an anonymous label corresponding to the URL that includes the generated rating and the determined metadata; transmitting the anonymous label to a real-time bidding exchange; and causing a verification beacon to be inserted into an advertisement to be displayed in the advertisement placement in response to a buyer purchasing an opportunity to place an advertisement in the advertisement placement using the anonymous label through the real-time bidding exchange.

17 Claims, 5 Drawing Sheets

Related U.S. Application Data continuation of application No. 16/700,179, filed on Dec. 2, 2019, now Pat. No. 11,176,580, which is a continuation of application No. 14/215,549, filed on Mar. 17, 2014, now Pat. No. 10,497,030.

(60) Provisional application No. 61/790,016, filed on Mar. 15, 2013.

(56) References Cited

U.S. PATENT DOCUMENTS

| | | | | |
|---|---|---|---|---|
| 2011/0313850 A1* | 12/2011 | Hahn | ............... | G06Q 30/0246 |
| | | | | 705/14.45 |
| 2012/0010927 A1 | 1/2012 | Attenberg et al. | | |
| 2012/0158496 A1* | 6/2012 | Solomon | ............ | G06Q 30/0251 |
| | | | | 705/14.49 |
| 2012/0240236 A1* | 9/2012 | Wyatt | ................... | G06F 21/10 |
| | | | | 726/25 |

OTHER PUBLICATIONS

Basu, A. and Muylle, S., "Authentication in E-Commerce", In Communications of the ACM, vol. 46, No. 12, Dec. 2003, pp. 159-166, available at: https://m-cacm.acm.org/magazines/2003/12/6615-authentication-in-e-commerce/fulltext?mobile=true.

Batet, M., et al., "Utility Preserving Query Log Anonymization via Semantic Microaggregation", In Information Sciences, vol. 242, No. 1, Sep. 2013, pp. 49-63, available at: https://www.sciencedirect.com/science/article/pii/S0020025513003174?via%3Dihub.

Notice of Allowance dated Jul. 14, 2021 in U.S. Appl. No. 16/700,179, pp. 1-3.

Notice of Allowance dated Aug. 1, 2019 in U.S. Appl. No. 14/215,549, pp. 1-4.

Notice of Allowance dated Oct. 18, 2023 in U.S. Appl. No. 17/526,367, pp. 1-8.

Office Action dated Jan. 6, 2021 in U.S. Appl. No. 16/700,179, pp. 1-4.

Office Action dated Jan. 12, 2018 in U.S. Appl. No. 14/215,549, pp. 1-15.

Office Action dated Feb. 16, 2023 in U.S. Appl. No. 17/526,367, pp. 1-50.

Office Action dated Mar. 14, 2017 in U.S. Appl. No. 14/215,549, pp. 1-15.

Office Action dated Jun. 9, 2023 in U.S. Appl. No. 17/526,367, pp. 1-11.

Office Action dated Dec. 31, 2018 in U.S. Appl. No. 14/215,549, pp. 1-13.

U.S. Appl. No. 12/859,763, filed Aug. 19, 2010, pp. 1-30.
U.S. Appl. No. 13/151,146, filed Jun. 1, 2011, pp. 1-14.
U.S. Appl. No. 13/614,878, filed Sep. 13, 2012, pp. 1-47.
U.S. Appl. No. 17/526,367, filed Nov. 15, 2021, pp. 1-15.

\* cited by examiner

METHODS, SYSTEMS, AND MEDIA FOR ENHANCING A BLIND URL ESCROW WITH REAL TIME BIDDING EXCHANGES

CROSS REFERENCE TO RELATED APPLICATIONS

This application is a continuation of U.S. patent application Ser. No. 17/526,367, filed Nov. 15, 2021, which is a continuation of U.S. patent application Ser. No. 16/700,179, filed Dec. 2, 2019, which is a continuation of U.S. patent application Ser. No. 14/215,549, filed Mar. 17, 2014, which claims the benefit of U.S. Provisional Application No. 61/790,016, filed Mar. 15, 2013, each of which is hereby incorporated by reference herein in its entirety.

TECHNICAL FIELD

The disclosed subject matter relates to methods, systems, and media for enhancing a blind URL escrow with real-time bidding exchanges.

BACKGROUND

Real-time bidding ("RTB") is an approach for buying and selling advertising impressions one impression at a time. As used herein, an impression is when a particular browser loads an advertisement. For example, if a user loads a web site containing an advertisement with a browser application, such a loading of the web site is one impression of the advertisement.

When selling impressions, a seller (e.g., a publisher) can contact a real-time bidding exchange system ("exchange system") with an offer to sell one or more impressions on a particular uniform resource locator ("URL"). The seller can include various metadata about the URL, which can include traffic data, content on the site located at the URL, etc. A user can load a web site using a browser application, where the code for the web site can include instructions to place an advertisement at a particular location within the web site. The instructions can direct the browser to contact one or more exchange systems and request an advertisement to be rendered at the particular location in the browser window. The exchange system can then send a request for advertisers to bid on the impression or advertising opportunity offered by the seller. In some cases, the request can include an anonymous label rather than the URL where the impression is available, and can also include metadata passed from the seller to the exchange system. These anonymous labels can be used to represent blind inventory.

The use of blind inventory can help publishers avoid sales channel conflicts between the publisher's direct advertisement sales and real-time bidding advertisement sales. For example, if an advertiser wants to place an advertisement on example.com directly, the publisher of example.com charges the advertiser a premium and does not want the advertiser to be able to go to an exchange system and place advertisements directly on example.com for a lesser amount. Blind inventory allows the publisher to sell advertising not sold through direct channels (e.g., remnants), for a less than premium amount while preventing advertisers that would otherwise buy direct advertisements from going around the publisher and buying direct advertisements for cheaper prices on an exchange system.

However, if the buyer does not have confidence in the metadata provided by the seller or if there is little information about the URL where the impression will be placed, the buyer may offer a lower price for the impression. Buyers may also be wary of bidding on an impression without knowing more about the site where the impression is going to be placed. Advertisers may also wish to verify that the impression was actually placed on the URL having the metadata passed from the seller, which is normally impractical in a blind URL system. There is, therefore, a need in the art for approaches that enhance buyer confidence in impressions sold on exchange systems.

SUMMARY

Methods, systems and media for enhancing a blind URL escrow with real-time bidding exchanges are provided. In accordance with some embodiments of the disclosed subject matter, a method for enhancing a blind URL escrow with real-time bidding exchanges is provided, the method comprising: receiving, using a hardware processor, a URL associated with an advertisement placement from a seller; generating a rating for the URL received from the seller; determining metadata based on the URL and a domain name associated with the seller; generating an anonymous label corresponding to the URL that includes the generated rating and the determined metadata; transmitting the anonymous label to a real-time bidding exchange; and causing a verification beacon to be inserted into an advertisement to be displayed in the advertisement placement in response to a buyer purchasing an opportunity to place an advertisement in the advertisement placement using the anonymous label through the real-time bidding exchange.

In accordance with some embodiments of the disclosed subject matter, a system for enhancing a blind URL escrow with real-time bidding exchanges is provided, the system comprising: a hardware processor that is configured to: receive a URL associated with an advertisement placement from a seller; generate a rating for the URL received from the seller; determine metadata based on the URL and a domain name associated with the seller; generate an anonymous label corresponding to the URL that includes the generated rating and the determined metadata; transmit the anonymous label to a real-time bidding exchange; and cause a verification beacon to be inserted into an advertisement to be displayed in the advertisement placement in response to a buyer purchasing an opportunity to place an advertisement in the advertisement placement using the anonymous label through the real-time bidding exchange.

In accordance with some embodiments of the disclosed subject matter, non-transitory computer-readable media containing computer executable instructions that, when executed by a processor, cause the processor to perform a method for enhancing a blind URL escrow with real-time bidding exchanges, the method comprising: receiving a URL associated with an advertisement placement from a seller; generating a rating for the URL received from the seller; determining metadata based on the URL and a domain name associated with the seller; generating an anonymous label corresponding to the URL that includes the generated rating and the determined metadata; transmitting the anonymous label to a real-time bidding exchange; and causing a verification beacon to be inserted into an advertisement to be displayed in the advertisement placement in response to a buyer purchasing an opportunity to place an advertisement in the advertisement placement using the anonymous label through the real-time bidding exchange.

In accordance with some embodiments of the disclosed subject matter, a system for enhancing a blind URL escrow with real-time bidding exchanges is provided, the system comprising: means for receiving a URL associated with an advertisement placement from a seller; means for generating a rating for the URL received from the seller; means for determining metadata based on the URL and a domain name associated with the seller; means for generating an anonymous label corresponding to the URL that includes the generated rating and the determined metadata; means for transmitting the anonymous label to a real-time bidding exchange; and means for causing a verification beacon to be inserted into an advertisement to be displayed in the advertisement placement in response to a buyer purchasing an opportunity to place an advertisement in the advertisement placement using the anonymous label through the real-time bidding exchange.

In some embodiments, the rating is based at least in part on a detection of objectionable content located at the received URL.

In some embodiments, the metadata includes data associated with a volume of traffic to the received URL.

In some embodiments, the system further comprises: means for receiving an actual URL from the verification beacon, wherein the actual URL corresponds to a location where the advertisement was displayed; and means for calculating a semantic distance between the URL received from the seller and the actual URL, wherein the semantic distance indicates a similarity between the received URL and the actual URL.

In some embodiments, the system further comprises: means for updating the metadata corresponding to the domain name associated with the seller based on the calculated semantic distance.

In some embodiments, the system further comprises: means for including a timing parameter with the rating; means for initiating the timing parameter in response to determining that the rating has been generated; and means for generating an updated rating in response to determining that the timing parameter has expired.

In some embodiments, the system further comprises: means for including a timing parameter with the anonymous label; means for initiating the timing parameter in response to determining that the anonymous label has been transmitted to the real-time bidding exchange; and means for generating an updated anonymous label in response to determining that the timing parameter has expired.

BRIEF DESCRIPTION OF THE DRAWINGS

Various objects, features, and advantages of the disclosed subject matter can be more fully appreciated with references to the following detailed description of the disclosed subject matter when considered in connection with the following drawings, in which like reference numerals identify like elements.

DETAILED DESCRIPTION

Figure 1:
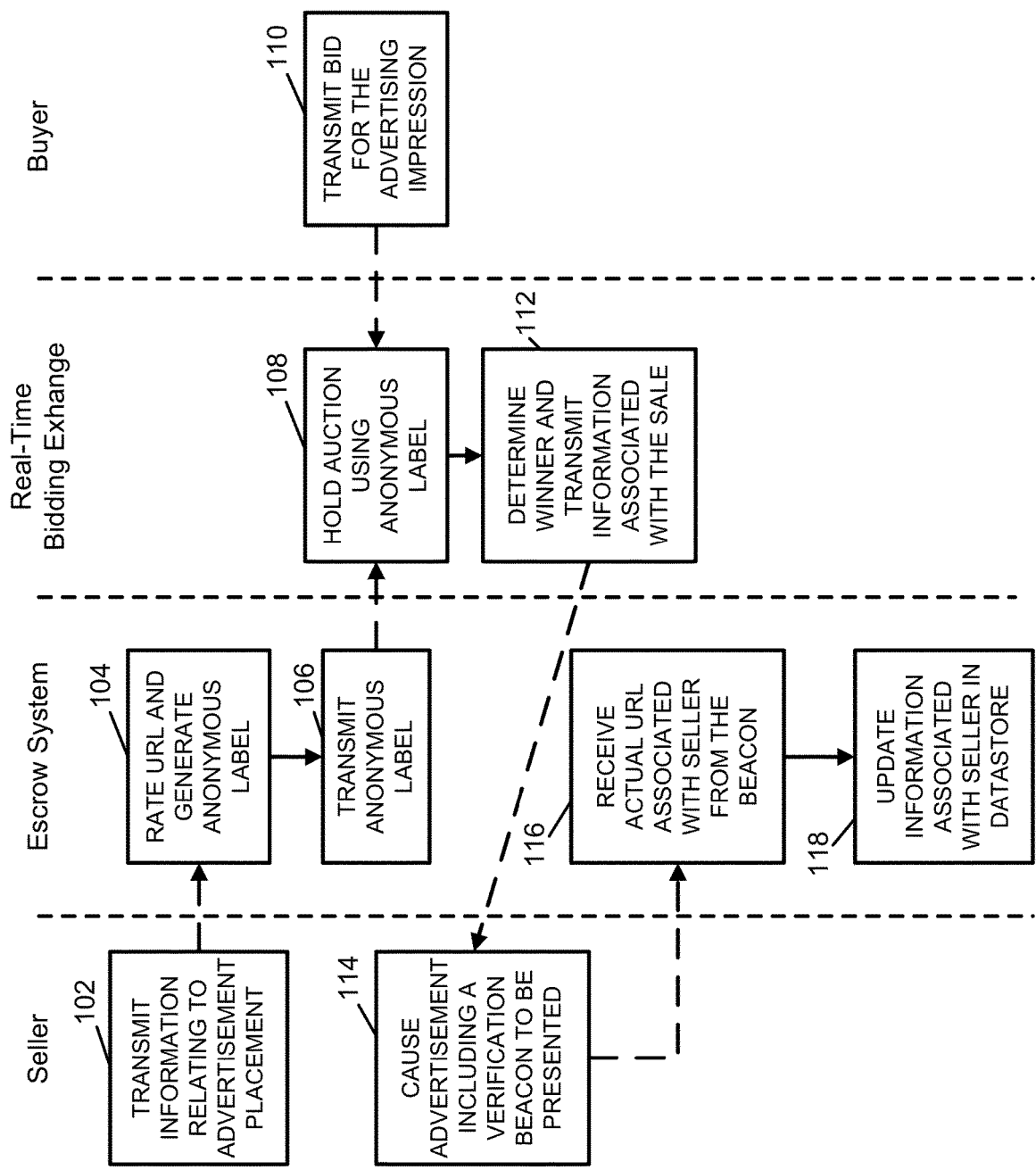
FIG. 1 shows an example of a data flow for selling and buying advertising impressions using a blind URL escrow with a real-time bidding exchange in accordance with some embodiments of the disclosed subject matter.

In accordance with various embodiments, mechanisms for enhancing a blind URL escrow with real time bidding exchanges are provided.

Generally speaking, these mechanisms can provide buyers in real-time bidding auctions for impressions with security without revealing the URL where the impression will be displayed by supplementing information about the URL where the impression will be displayed, such as a rating for the URL, a rating for the seller, and/or additional metadata about the URL.

In some embodiments, a seller can transmit a URL corresponding to an advertisement placement (also referred to herein as "an impression") that will be made available on an exchange system to a third party using the mechanisms, where the third party can have a server executing an escrow system that is not a seller, buyer, exchange system, supply side platform, or demand side platform involved in the real-time bidding auction for the advertisement placement. For example, the third party can be a trusted third party that has a relationship with seller, buyers, exchange systems, supply side platforms, and/or demand side platforms. The third party is also referred to herein as "the escrow system." The escrow system can then generate an anonymous label that can be used when selling the impression on one or more exchange systems. In some embodiments, the escrow system can also include information about the URL to be presented to buyers with the anonymous label. For example, the escrow system can use the information about the URL to generate metadata about the URL. As another example, the escrow system can use the information about the URL to generate a rating of the URL based on the URLs content. As yet another example, the escrow system can use the information about the URL to generate a reliability score based on how reliable the URLs provided from the particular seller that provided the URL have been in the past.

In some embodiments, the escrow system can provide supplemental information to a buyer, such that the buyer can use the information to make decisions related to the price for a particular impression. For example, a buyer can be confident that the information provided about the URL that the particular impression is intended for placement, because that information is provided by the escrow system and not by the seller of the impression or the exchange system. As another example, a buyer may be willing to pay a higher price for a seller with a high reliability score, because the buyer can be confident that the impression will actually be placed on the URL that the metadata and rating were generated for.

In some embodiments, the escrow system can cause a beacon to be delivered to a user's browser along with the advertisement bought for that impression. In response to executing on the browser application, the beacon can transmit information to the escrow system that can be used in rating the reliability of the seller of the impression, among other things. For example, the escrow system can receive the actual URL where the advertisement was placed from the beacon. The escrow system can also match the anonymous label for the impression that was sold to the URL that the seller provided for that impression. These two pieces of information can then be used to determine how close the URL provided by the seller is to the actual URL where the impression was delivered. How close these two URLs are to one another can be referred to as the semantic distance between the two URLs. URLs that are different from each other are considered to have a greater semantic distance between them. For example, the URLs "www.example.com" and "www.example.com/home" can have a small semantic distance, whereas the URLs "www.example.com" and "www.state.edu" can have a large semantic distance. The semantic distance between the URL provided by the seller and the actual URL can be used to evaluate the reliability of the seller.

Turning to FIG. 1, an example 100 of a data flow that can be implemented on multiple devices for buying and selling advertising impressions using a blind URL escrow is illustrated in accordance with some embodiments of the disclosed subject matter.

A seller can transmit information relating to an advertising impression at 102. The transmitted information can include any suitable details. For example, in some embodiments, the transmitted information can include a URL associated with the advertising impression, information relating to placement of an advertisement associated with the advertising impression for sale, and/or any other suitable information.

An escrow system can receive the information from the seller and can subsequently generate a rating corresponding to the URL and an anonymous label corresponding to the advertising impression at 104. The rating and the anonymous label can be generated using any suitable technique and can be based on any suitable information and/or metadata, as described below in connection with blocks 204 and 206 of FIG. 2.

The escrow system can transmit the anonymous label to a real-time bidding exchange(s) at 106 using any suitable technique, for example, those described below in connection with block 208 of FIG. 2.

In response to receiving the anonymous label, the real-time bidding exchange(s) can hold an auction for the associated advertising impression at 108. As described below in connection with FIG. 2, the auction can be made available to buyers for a period of time. During this time, one or more buyers can transmit one or more bids for the advertising impression being auctioned at 110. Although only one buyer is illustrated in FIG. 1 to avoid over-complicating the figure, in some embodiments, any suitable number of buyers can participate in the auction from any suitable locations.

After the period of time has elapsed, the real-time bidding exchange can determine a winner of the auction and transmit an indication of the sale to the seller at 112. In some embodiments, the winner can be determined based on the value of the received bids. Additionally or alternatively, in some embodiments, other criteria (e.g., content contained in the prospective advertisements) can be considered, as described below in connection with FIG. 2.

The seller can cause an advertisement from the winning buyer to be presented to a browser application at 114, using any suitable technique, for example, those described below in connection with blocks 212 and 214 of FIG. 2. In some embodiments, a verification beacon can be included in the advertisement, which can transmit any suitable information related to the advertising impression (e.g., URL from which the advertising impression was delivered, time of advertising impression, and/or any other suitable information) to the escrow system and/or to the seller.

The escrow system can receive the actual URL associated with the advertising impression at 116 from the verification beacon. The escrow system can then calculate metrics relating to the reliability of the seller using any suitable techniques (e.g., by calculating a semantic distance between the actual URL associated with the advertising impression and the URL received at block 104), as described below in connection with FIG. 2.

The escrow system can update its datastore(s) with the calculated metrics at 118. The escrow system can use any suitable technique or combination of techniques to update data in the datastore(s), for example, those described below in connection with FIG. 4.

Figure 2:
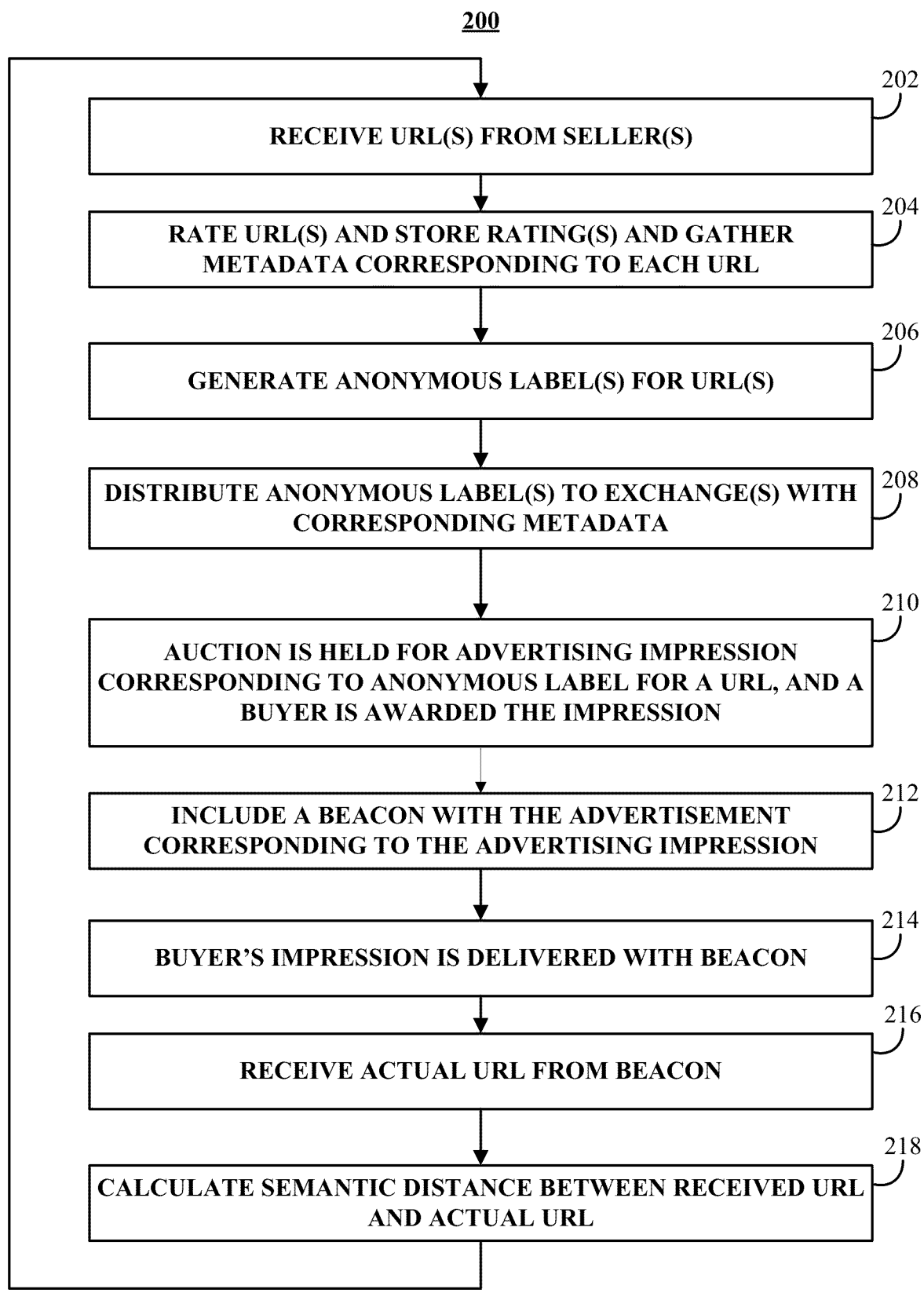
FIG. 2 shows an example of a process for maintaining and using a blind URL escrow with real-time bidding exchanges in accordance with some embodiments of the disclosed subject matter.

Turning to FIG. 2, an example of a process 200 for maintaining and using a blind URL escrow with real-time bidding exchanges is illustrated in accordance with some embodiments. Process 200 can begin at 202, where an escrow system can receive (e.g., from a seller) pairs of URLs and impressions to be sold on those URLs. In some embodiments, information submitted by the seller can include a domain name, a full URL, a location where the impression will be located within the page specified by the URL, whether the impression is above the fold, a size of the advertisement corresponding to the impression, any other suitable information, or any combination thereof. For example, a seller can include an identification of the URL where an impression will be sold, and a reference number that will be included in the code used for requesting an advertisement that is placed on that URL (referred to herein as an "advertisement call") and that corresponds to the impression being sold.

It should be noted that the seller can be any suitable entity that provides URL information and/or advertisement placement information on those URLs. For example, a content publisher can contact a seller, such as a supply side platform or a supply side advertising network, that can manage impressions on one or more websites. In this example, the supply side platform can transmit URL information and/or advertisement placement information to the escrow system.

At 204, the escrow system can rate the URL provided by the seller and store the rating in connection with the URL. In some embodiments, the rating can be based on the content of the web site specified by the URL. For example, the rating can be based on the presence of guns, sex, nudity, use of sexual language, alcohol, drugs, violence, offensive language, hate speech, displays of the infliction of pain, etc. As a more particular example, the rating can indicate a probability that the URL and/or a page associated with the URL contains particular content or a particular category of content at a given time (e.g., user-generated content, content associated with competitions, types of advertisements that tend to appear with the content, and/or any other suitable category of content).

The escrow system can generate the rating using any suitable technique or combination of techniques. For example, in some embodiments, the rating can be generated based on one or more statistical models which can incorporate any suitable factors, including a text analysis of the URL, HTML source code associated with the URL, an image analysis of images associated with the URL, a text analysis of a page associated with the URL, information associated with hyperlinks contained on a page associated with the URL, tags and/or source information corresponding to images associated with the URL, site and/or domain registration information corresponding to the URL, and/or any other suitable factors. In some embodiments, any suitable text analysis (e.g., semantic analysis, identification of particular keywords, and/or any other suitable text analysis) can be performed prior to generation of the one or more statistical models. Features for rating URLs for the presence of potentially objectionable content are further described, for example, in commonly owned, commonly assigned U.S. patent application Ser. No. 13/151,146 and U.S. patent application Ser. No. 12/859,763 which are hereby incorporated by reference herein in their entireties.

At 204, the escrow system can also gather and/or determine metadata pertaining to the URL. In some embodiments, the metadata can include the content of the URL (e.g., sports, news, financial news, humor, gambling, etc.), the traffic for the URL, viewability of the particular impression being sold, quality metrics, etc. Advertisement viewability features are further described, for example, in commonly owned, commonly assigned U.S. patent application Ser. No. 13/614,878, which is hereby incorporated by reference herein in its entirety. The metadata can be determined using any suitable technique or combination of techniques. For example, in some embodiments, the escrow system can determine metadata related to the content of the URL by analyzing the text of the URL and/or text in a page associated with the URL for the presence of particular keywords which indicate content. As another example, in some embodiments, the escrow system can determine the traffic to the URL by querying a suitable database or service.

At 206, anonymous labels can be generated for the impressions being sold by the seller, and can be associated with the URL by the escrow system. In some embodiments, the anonymous labels can be generated stochastically using a key. For example, the URL and other information about the impression being sold by the seller can be input to a hash function and the output can be used as the anonymous label. As another example, some portion of the URL (including all of a URL) can be used as a seed for a pseudorandom number generator, where the output of the pseudorandom number generator can be used as the anonymous label. Any other suitable method of producing the anonymous labels can also be used. After an anonymous label is generated, it can be stored in association with the URL.

Additionally or alternatively, a series of anonymous labels can be stored in association with the anonymous label and the anonymous label associated with the impression and/or URL can be changed from time to time. For example, the anonymous label can be changed each time an impression is purchased that corresponds to the anonymous label, each time a certain period of time passes, each time some specified event happens, and/or at any other suitable time.

In some embodiments, the anonymous labels across a domain can be generated systematically so that it is clear to the escrow system what URL in the seller's domain a specific anonymous label corresponds to. For example, the escrow system can determine the domain and domain level of an impression based on the anonymous label if the escrow system uses a systematic approach to generating the anonymous labels, and this can be used to aggregate all of the impressions being sold by a seller across their domain.

At 208, the escrow system can distribute the anonymous label corresponding to an impression offered by the seller in response to receiving a request for an advertisement from an advertisement call associated with the impression. The advertisement call associated with the impression can cause an advertisement to be requested when a browser accesses a URL that causes code including the advertisement call associated with the impression to be delivered to and executed by the browser. In some embodiments, the escrow system can determine the URL where the advertisement call originated and determine if the URL where the advertisement call originated is the same as the URL received from the seller in association with the impression received at 202. If it is the same URL received from the seller at 202, then the escrow system can provide the rating and metadata stored in association with the URL. If it is not the same URL received at 202, then the escrow system can still provide the rating and metadata, but can also include information indicating that the URL is not the same as the URL provided by the seller.

In some embodiments, the advertisement call used by the seller to request advertisements from the exchange system can include code to redirect the request to the escrow system and the escrow system can then pass on the request to one or more exchange systems through any appropriate intermediaries, and can include the anonymous label to be used when selling the impression, the rating, metadata, any other suitable information, or any suitable combination thereof.

At 210, the exchange system can hold an auction for the advertising impression by presenting the impression using the anonymous label, and any other information distributed to the exchange system by the escrow system. A buyer can be awarded with the opportunity to place an advertisement in the advertisement placement corresponding to the impression based on the outcome of the auction. In some embodiments, the auction can be made available to buyers for a specified period of time (e.g., 0.1 seconds, 0.5 seconds, and/or any other suitable period of time), and after this time the highest bidder can be awarded the impression. Additionally or alternatively, if the highest bidder does not meet criteria set by the seller, the impression can be awarded to the highest bidder that meets the seller's criteria. For example, in some embodiments, the seller's criteria can include that advertisements that contain certain content (e.g., alcohol, guns, pornography, and/or any other suitable type of content) not be presented. In some instances, there can be no qualified bidder that meets criteria set by the seller, and in such a case the exchange system can return an error or a message that no qualified bidder was awarded the impression.

At 212, in some embodiments, a beacon can be included with the advertisement delivered to the browser, where the beacon can cause the browser to send specified information to the escrow system. For example, this information can include the URL associated with the page where the beacon was loaded, a reference number of the impression, the location of the beacon within the page specified by the URL, the size of the browser window, the IP address of the device running the browser, a type of device running the browser, and/or any other suitable information. The beacon can be included using any suitable technique or combination of techniques. For example, in some embodiments, the beacon can include a small (e.g., 1×1 pixel) image which can be embedded in the advertisement.

At 214, the buyer's impression can be delivered by transmitting an advertisement specified by the buyer to the browser that sent the advertisement call associated with the impression.

At 216, the escrow system can receive the actual URL where the advertisement is loaded corresponding to the impression sold at 210. In some embodiments, the URL can be transmitted by the beacon at some point before the user navigates away from the URL and/or closes the browser that loaded the URL. For example, the beacon can transmit the URL when the beacon is loaded by the browser. As another example, the beacon can transmit the URL before the web page specified by the URL is unloaded (e.g., before the user navigates away from the page or closes the browser). As yet another example, the beacon can store various information about the web page specified by the URL in a cache of the browser and transmit that information, including the URL, at a specified time.

At 218, the escrow system can calculate the semantic distance between the URL that was received from the seller in association with the impression sold auctioned at 210, and the actual URL received from the beacon at 216. In some embodiments, the escrow system can calculate the semantic distance between the URL received from the seller at 202, and the actual URL received from the beacon at 216. For example, the escrow system can use the reference number of the impression to find the URL received from the seller at 202 in association with the impression. The escrow system can then compare the URL received from the seller at 202 to the actual URL received from the beacon, and can calculate the semantic distance between the pair of URLs.

In some embodiments, the semantic distance can be based on the distance between the two URLs. In some embodiments, the distance between the two URLs can be computed based on a comparison of their alphanumeric strings (e.g., by calculating a Hamming distance, a Levenshtein distance, and/or any other suitable metric). Additionally or alternatively, the semantic distance can be based on the difference between IP addresses specified by the two URLs. Additionally or alternatively, the semantic distance can be based on the difference between the top level domain of the two URLs (e.g., com, edu, org, etc.). Additionally or alternatively, the semantic distance can be based on the difference between the path, query string, or any other part of the URL. Additionally, the semantic distance can be based on any suitable combination of the foregoing.

In some embodiments, the semantic distance can be used to provide a reliability score for a publisher. For example, a publisher that routinely sells impressions on the URL that they sent to the escrow system can have a high reliability score, while a publisher that routinely sells impressions on a URL that is very different than the URL that they sent to the escrow system can have a low reliability score. The reliability score can be calculated using any suitable technique or combination of techniques. For example, in some embodiments, the reliability score can be calculated as a proportion of the number of times the publisher sold impressions on the URL sent to the escrow system. In some embodiments, the reliability score can be weighted by any suitable factors, such as the semantic distance, the total number of impressions sold, the total number of impressions sold over a particular time period (e.g., the last week, the last month, the last year, and/or any other suitable time period). This reliability score can be included with the information sent by the escrow system to the exchange system and can be used by the buyer. For example, a buyer may bid a higher price for an impression offered by a reliable publisher than they would for an impression offered by a less reliable publisher.

Figure 3A:
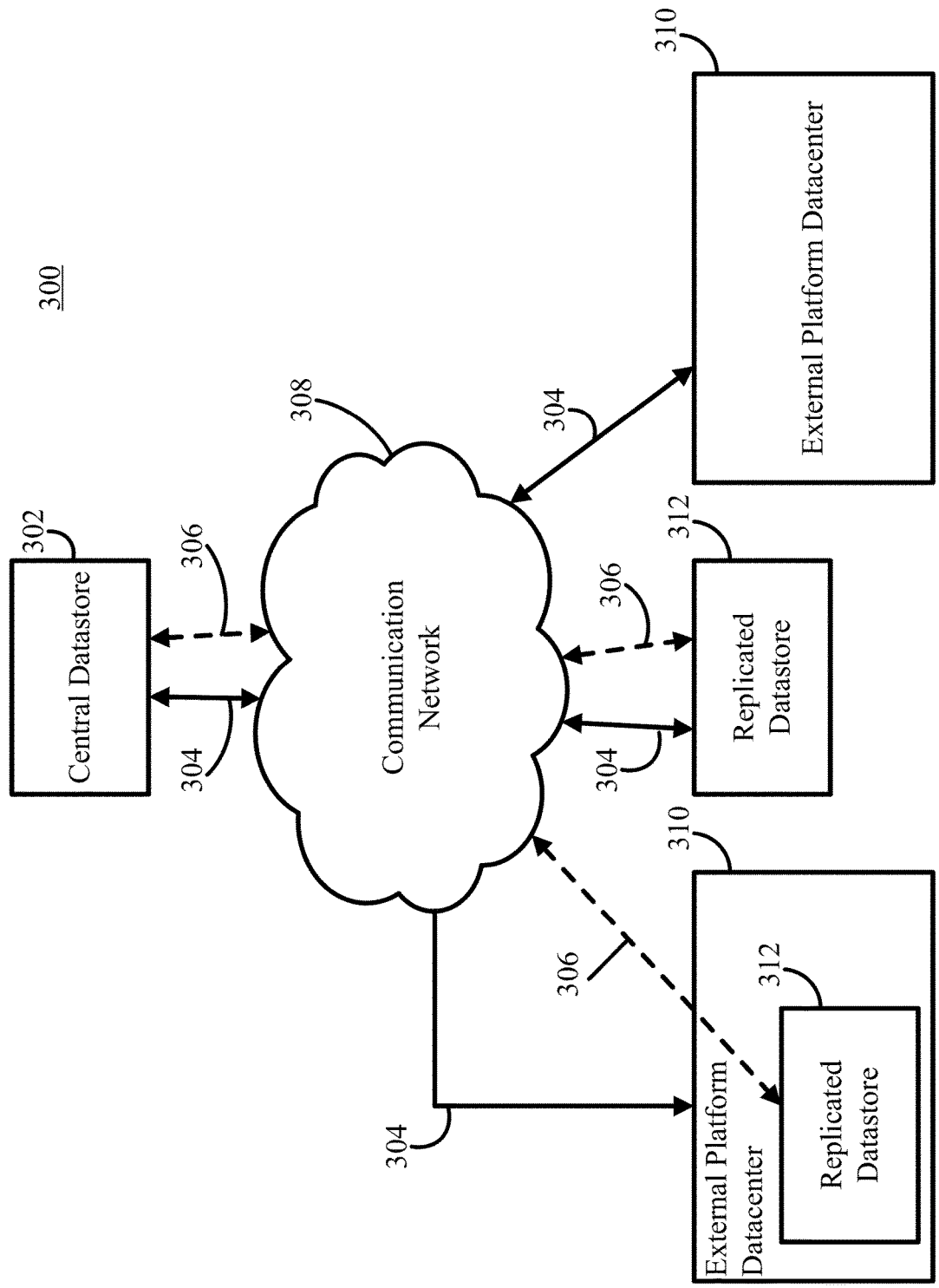
FIGS. 3A and 3B show an example of a generalized schematic diagram of an illustrative system for implementation of mechanisms described herein for enhancing a blind URL escrow with real-time bidding exchanges and a detailed example of hardware that can be used in accordance with some embodiments of the disclosed subject matter.

FIG. 3A shows an example of a generalized schematic diagram of a system 200 on which the mechanisms for maintaining and using a blind URL escrow with real-time bidding exchanges described herein can be implemented as an escrow system application in accordance with some embodiments. As illustrated, system 200 can include a central datastore 302. Central datastore 302 can be any suitable computing device for providing access to the application, such as a server, a processor, a computer, a data processing device, or any suitable combination of such devices. For example, the application can be distributed into multiple backend components and multiple frontend components or interfaces. In a more particular example, backend components, such as data collection and data distribution can be performed on one or more central datastores 302. Central datastore 302 can be connected by one or more communications links 304 and 306 to a communications network 308 that can be linked via a communications links 304 and 306 to one or more external platform datacenters 310, and/or one or more replicated datastores 312.

System 200 can include one or more external platform datacenters 310. External platform datacenters 310 can be any suitable computing device for running one or more real-time bidding exchange system applications, such as a server, a processor, a computer, a data processing device, or any suitable combination of such devices. For example, the exchange system applications can be distributed into multiple backend components and multiple frontend components or interfaces. In a more particular example, backend components, such as data collection and data distribution can be performed on one or more external platform datacenters 310.

System 200 can include one or more replicated datastores 312. Replicated datastores can be any suitable computing device for replicating the escrow system application provided by central datastore 302 such as a server, a processor, a computer, a data processing device, or any suitable combination of such devices. For example, the escrow system application can be distributed into multiple backend components and multiple frontend components or interfaces. In a more particular example, backend components, such as data collection and data distribution can be performed on one or more replicated datastores 312.

More particularly, for example, each of central datastore 302, external platform datacenters 310 and replicated datastores 312 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc.

Referring back to FIG. 3A, communications network 308 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any suitable combination of any of such networks. Communications links 304 and 306 can be any communications links suitable for communicating data between central datastore 302, external platform datacenters 310 and replicated datastores 312, such as network links, dial-up links, wireless links, hard-wired links, any other suitable communications links, or any suitable combination of such links. Communication links 304 can provide communication between central datastore 302, external platform datacenters 310 and replicated datastores 312, while communication links 306 can be dedicated communication links (for example, using a particular port, a VPN, etc.) that enable synchronization between central datastore 302 and replicated datastores 312. Central datastore 302, external platform datacenters 310 and replicated datastores 312 can be located at any suitable location.

In some embodiments, replicated datastore 312 can be implemented as part of external platform datacenter 310. For example, replicated datastore 312 can be implemented as a separate server that is part of external platform datacenter 310 and can have a dedicated communication link 306 to synchronize with central datastore 302. Additionally or alternatively, information stored in replicated datastore 310 located within external platform datacenter 310 can be inaccessible to external platform datacenter 310 except through the escrow system application.

Figure 3B:
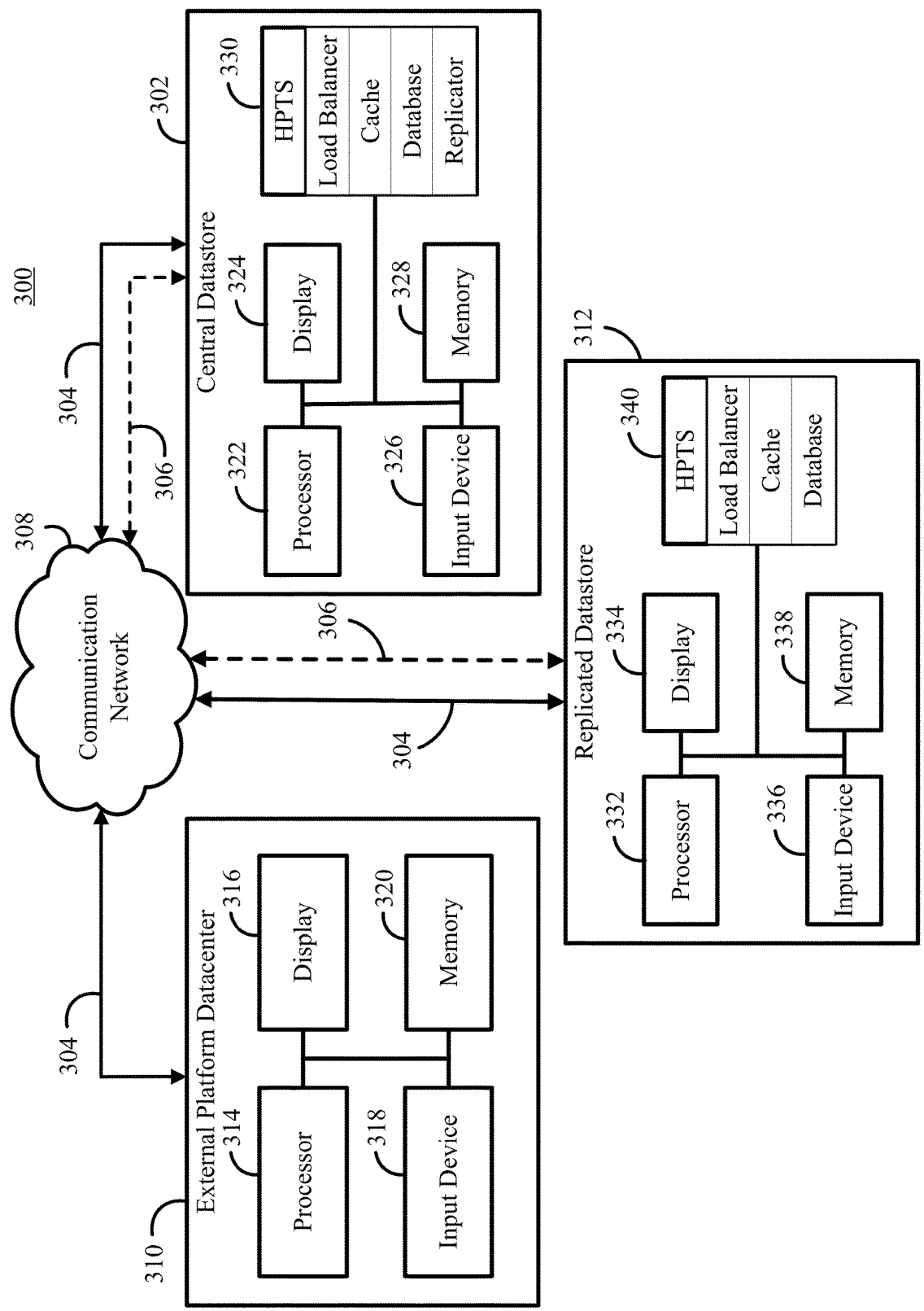

FIG. 3B illustrates an example of hardware 200 where central datastore 302, one external platform datacenter 310 and one replicated datastore depicted in FIG. 3A are illustrated in more detail. Referring to FIG. 3B, external platform datacenter 310 can include a processor 314, a display 316, an input device 318, and memory 320, which can be interconnected. In some embodiments, memory 320 can include a storage device (such as a computer-readable medium) for storing a computer program for controlling processor 314.

Processor 314 can use the computer program to run the exchange system application that loads holds an auction for selling an impression. Processor 314 can also use the computer program to present on display 316 data received through communications link 304, information related to the exchange system application and/or other data received through communication links 304 and commands and values transmitted by a user of external platform datacenter 310. It should also be noted that data received through communications link 304 or any other communications links can be received from any suitable source. Input device 318 can be a computer keyboard, a cursor-controller, dial, switchbank, lever, touchscreen, or any other suitable input device as would be used by a designer of input systems or process control systems.

Central datastore 302 can include processor 322, display 324, input device 326, memory 328, and high performance technology stack 330, which can be interconnected. In some embodiments, memory 328 can include a storage device for storing data received through communications links 304 and 306 or through other links, and can also receive commands and values transmitted by one or more users and/or sellers. The storage device can further include a program for controlling processor 322.

Higher performance technology stack 330 ("HPTS") can include a load balancer, a cache, a database, and a replicator. HPTS 330 can store the anonymous labels, ratings, metadata, impression reference numbers, semantic distances, reliability scores, etc., in the database that is part of HPTS 340. The replicator of HPTS 330 can be used to synchronize information between central datastore 302 and replicated datastores 312.

Replicated datastore 302 can include processor 332, display 334, input device 336, memory 338, and high performance technology stack 340, which can be interconnected. In some embodiments, memory 338 can include a storage device for storing data received through communications links 304 and 306 or through other links, and can also receive commands and values transmitted by one or more users and/or sellers. The storage device can further include a program for controlling processor 332.

HPTS 340 can include a load balancer, a cache, and a database. HPTS 340 can store the anonymous labels, ratings, metadata, impression reference numbers, semantic distances, reliability scores, etc., in the database that is part of HPTS 340. The data stored in the database of HPTS 340 can be the same as the data stored in the database of HPTS 330 of central datastore 340.

In some embodiments, replicated datastores 312 can be distributed in certain locations such that they can provide the rating information, metadata, anonymous labels, etc., that are stored in the database of HPTS 340 in the time between when a browser requests an advertisement from an Exchange for a specific impression, and the time that the advertisement is delivered. For example, replicated datastores 312 can be located close to, or within, external platform datacenters 310 in order to limit communication delays and quickly provide the data stored in database of HPTS 340.

Figure 4:
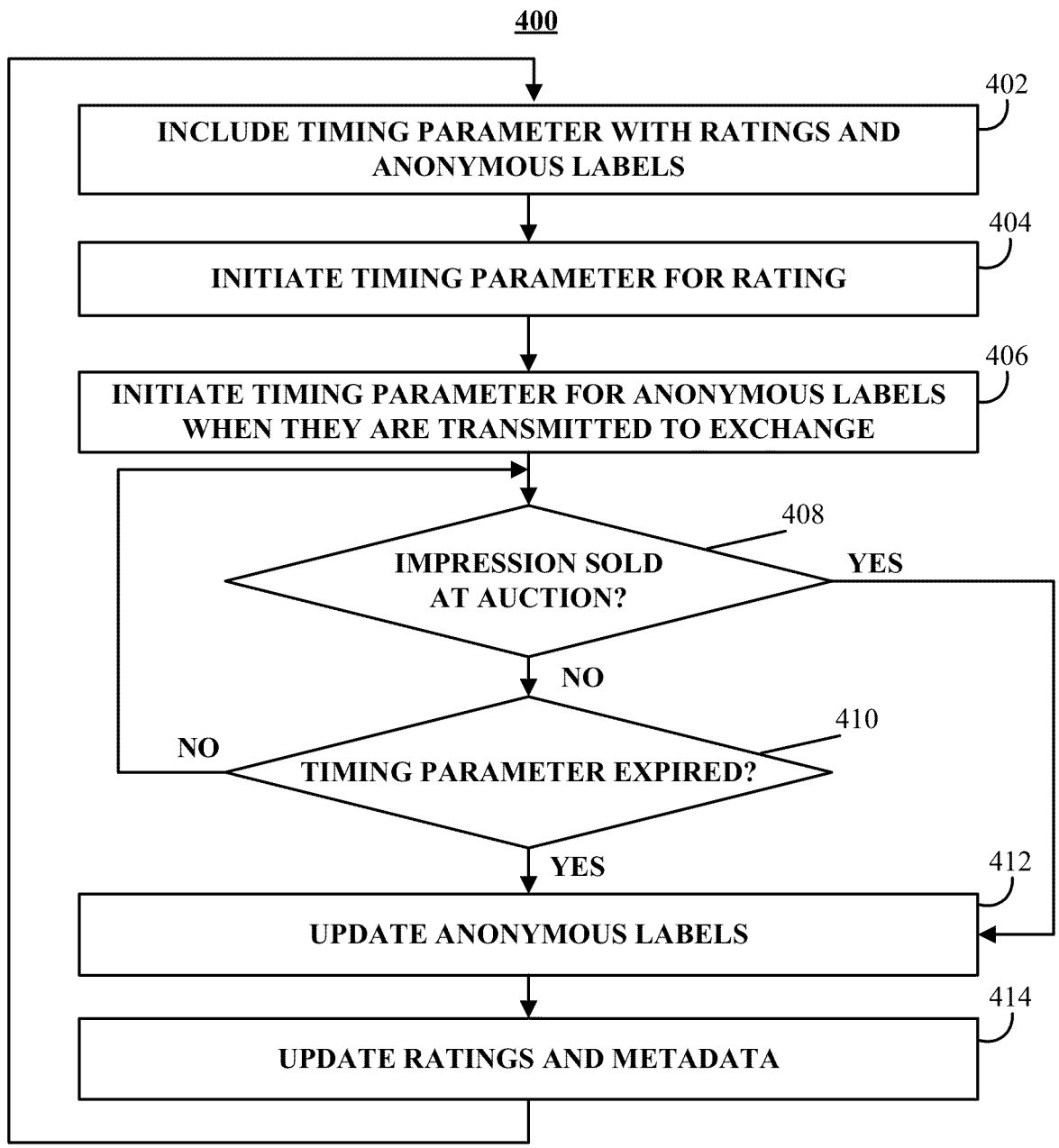
FIG. 4 shows an example of a process for updating information stored in the database in a central store of an escrow system in accordance with some embodiments of the disclosed subject matter.

FIG. 4 shows an example of a process 400 for updating information stored in the database of HPTS 330 in central datastore 302 in accordance with some embodiments. Process 400 can begin at 402, where one or more timing parameters (e.g., a time-to-live value, or "TTL") can be included with the ratings and/or metadata determined at 204 and/or with the anonymous labels generated at 206. The timing parameter(s) can be included using any suitable technique or combination of techniques. For example, in some embodiments, process 400 can create and/or modify an indicator associated with the ratings, metadata, and/or anonymous labels which identifies a location in memory at which the timing parameter(s) are stored.

At 404, the timing parameter included with the ratings and metadata can be initiated when the ratings and metadata are stored at 204. At 406, a timing parameter included with an anonymous label can be initiated when the anonymous label is transmitted to the exchange system at 208. In some embodiments, the timing parameter for the ratings and metadata can be the same or different than the timing parameter for the anonymous labels. For example, a value of the timing parameter for the ratings and metadata can be greater than a value of the timing parameter for the anonymous labels, such that the ratings and metadata are considered valid for longer than the anonymous labels. In some embodiments, the timing parameter can be initiated with any suitable value. In some such embodiments, the timing parameter can be updated, and when the timing parameter reaches a particular value, the data associated with the timing parameter can be discarded or marked as no longer valid in any suitable manner. For example, in some embodiments, the timing parameter can be initiated with a current time and can be updated, and the data associated with the timing parameter can be discarded when the timing parameter reaches a particular time in the future. As another example, in some embodiments, the timing parameter can be initiated with a time duration (e.g., a minute, five minutes, an hour, and/or any other suitable time duration) over which the associated data is to be considered valid, and the value of the timing parameter can be updated to reflect how much time of the initial time duration remains (e.g., by updating the timing parameter with any suitable frequency). As yet another example, in some embodiments, the timing parameter can be initiated with a specified time at which the associated data is to be discarded.

At 408, the escrow system can determine if an impression associated with an anonymous label generated at 206 has been sold in an auction held by an exchange system. In some embodiments, the escrow system can determine whether an impression has been sold by determining whether the escrow system has received an indication of the sale from the exchange system. Additionally or alternatively, the escrow system can determine an impression has been sold when a beacon informs the escrow system that the impression has been delivered. If it is determined at 408 that an impression has been sold ("YES" at 408), process 400 can move to 412, otherwise ("NO" at 408) process 400 can move to 410.

At 410, the escrow system can determine if the TTL for an anonymous label or the TTL for the ratings and metadata has expired using any suitable technique or combination of techniques and using any suitable information. For example, in some embodiments, the determination can be made based on the value of the timing parameter initiated at 404. As a more particular example, in instances where the timing parameter is initiated with a value which decreases in time, process 400 can determine whether the timing parameter has reached a predetermined value (e.g., zero, a particular time of expiration, and/or any other suitable value). As another more particular example, in instances where the timing parameter is initiated with a value which indicates a time at which the data is to expire, process 400 can determine if the indicated expiration time has arrived, for example, by checking an internal clock. In some embodiments, process 400 can determine that the anonymous label, ratings, and/or metadata have expired and/or are to expire if the value associated with the timing parameter is within a predetermined range. For example, if the associated data is to expire when the timing parameter reaches 0, process 400 can determine that the associated data is to be considered expired if the timing parameter is within a particular range of 0 (e.g., within 5%, 10%, and/or any other suitable range).

If the escrow system determines that a TTL has not expired ("NO" at 408), process 400 can move to 408 to determine if an impression has been sold. If the escrow system determines that one or more TTLs have expired ("YES" at 410), then process 400 can move to 412.

At 412, the escrow system can update the anonymous labels for which the TTL has expired or for which an impression corresponding to the anonymous label has been sold. In some embodiments, all anonymous labels can be updated when the TTL for any anonymous label expires or when any impression is sold. Additionally or alternatively, only anonymous labels for which either of the conditions above have been met can be updated. For example, if a TTL for an anonymous label expires at 410, the escrow system can update the anonymous label and send the new anonymous label to one or more exchange systems, along with the stored rating and/or metadata. In some instances, as described below, the ratings and/or metadata can be updated as well before sending the updated anonymous label to the exchange systems. As another example, if an impression corresponding to an anonymous label is sold at 408, the anonymous label corresponding to that impression can be updated for future sales. This can prevent the exchange systems, buyers, sellers, or third parties from learning the identity of the URL corresponding to the impression and associating it with the anonymous label used to sell the impression. The anonymous label can be updated using any suitable technique or combination of techniques, for example, the techniques described above in connection with block 206 of FIG. 2.

At 414, the escrow system can update the ratings and/or metadata for which the TTL has expired. In some embodiments, all ratings and/or metadata associated with a URL can be updated each time a TTL expires for any rating, metadata and/or anonymous label. Additionally or alternatively, the ratings and/or metadata corresponding to only the TTL that expired can be updated. For example, the TTL for a particular rating can be based on how often the content of the URL that was rated changes, and the rating can be updated more frequently when the content changes more frequently. As another example, the TTL for any rating and/or metadata can be a set value such that the ratings and/or metadata are updated frequently to keep the information accurate if the content of a URL were to change.

After updating one or more anonymous labels at 412 and/or ratings and metadata at 414, process 400 can move to 402 and include a new TTL with the updated labels and or ratings/metadata.

Accordingly, methods, systems, and media for enhancing a blind URL escrow with real-time bidding exchanges are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for enhancing a uniform resource locator (URL) escrow system, the method comprising:
   transmitting, using a hardware processor, an anonymous label that corresponds to a URL;
   generating, using the hardware processor, an updated anonymous label that indicates that a buyer has purchased an opportunity to place a content item in a content placement that corresponds to the anonymous label, wherein a verification beacon is inserted into the content item to be presented in the content placement;
   receiving, using the hardware processor, an actual URL from the verification beacon, wherein the actual URL indicates a location where the content item was presented; and
   determining, using the hardware processor, whether a seller of the content placement on the URL should be identified as being trustworthy based on a similarity between the URL received from the seller and the actual URL, wherein the seller is identified as being trustworthy using a reliability score that is based in part on an amount that the seller is identified as a trusted seller or an untrusted seller.

2. The method of claim 1, further comprising generating the anonymous label corresponding to the URL by inputting the URL, a rating for the URL, and metadata based on content of a page specified by the URL into a hash function and receiving an output from the hash function that is the anonymous label corresponding to the URL.

3. The method of claim 2, wherein the rating is based at least in part on a detection of objectionable content located at the received URL.

4. The method of claim 2, wherein the metadata includes data associated with a volume of traffic to the received URL.

5. The method of claim 2, further comprising generating the rating for the URL based on the content of the page specified by the URL.

6. The method of claim 2, further comprising:
including a timing parameter with the rating;
initiating the timing parameter in response to determining that the rating has been generated; and
generating an updated rating in response to determining that the timing parameter has expired.

7. The method of claim 1, further comprising:
including a timing parameter with the anonymous label;
initiating the timing parameter in response to determining that the anonymous label has been transmitted to the real-time bidding exchange; and
generating an updated anonymous label in response to determining that the timing parameter has expired.

8. The method of claim 1, further comprising:
calculating a semantic distance between the URL received from the seller and the actual URL, wherein the semantic distance indicates the similarity between the received URL and the actual URL; and
updating metadata corresponding to a domain name associated with the seller based on the calculated semantic distance.

9. A system for enhancing a uniform resource locator (URL) escrow system, the system comprising:
a hardware processor that is configured to:
transmit an anonymous label that corresponds to a URL;
generate an updated anonymous label that indicates that a buyer has purchased an opportunity to place a content item in a content placement that corresponds to the anonymous label, wherein a verification beacon is inserted into the content item to be presented in the content placement;
receive an actual URL from the verification beacon, wherein the actual URL indicates a location where the content item was presented; and
determine whether a seller of the content placement on the URL should be identified as being trustworthy based on a similarity between the URL received from the seller and the actual URL, wherein the seller is identified as being trustworthy using a reliability score that is based in part on an amount that the seller is identified as a trusted seller or an untrusted seller.

10. The system of claim 9, wherein the hardware processor is further configured to generate the anonymous label corresponding to the URL by inputting the URL, a rating for the URL, and metadata based on content of a page specified by the URL into a hash function and receiving an output from the hash function that is the anonymous label corresponding to the URL.

11. The system of claim 10, wherein the rating is based at least in part on a detection of objectionable content located at the received URL.

12. The system of claim 10, wherein the metadata includes data associated with a volume of traffic to the received URL.

13. The system of claim 10, wherein the hardware processor is further configured to generate the rating for the URL based on the content of the page specified by the URL.

14. The system of claim 10, wherein the hardware processor is further configured to:
include a timing parameter with the rating;
initiate the timing parameter in response to determining that the rating has been generated; and
generate an updated rating in response to determining that the timing parameter has expired.

15. The system of claim 9, wherein the hardware processor is further configured to:
include a timing parameter with the anonymous label;
initiate the timing parameter in response to determining that the anonymous label has been transmitted to the real-time bidding exchange; and
generate an updated anonymous label in response to determining that the timing parameter has expired.

16. The system of claim 9, wherein the hardware processor is further configured to:
calculate a semantic distance between the URL received from the seller and the actual URL, wherein the semantic distance indicates the similarity between the received URL and the actual URL; and
update metadata corresponding to a domain name associated with the seller based on the calculated semantic distance.

17. A non-transitory computer-readable medium containing computer executable instructions that, when executed by a processor, cause the processor to perform a method for enhancing a uniform resource locator (URL) escrow system, the method comprising:
transmitting an anonymous label that corresponds to a URL;
generating an updated anonymous label that indicates that a buyer has purchased an opportunity to place a content item in a content placement that corresponds to the anonymous label, wherein a verification beacon is inserted into the content item to be presented in the content placement;
receiving an actual URL from the verification beacon, wherein the actual URL indicates a location where the content item was presented; and
determining whether a seller of the content placement on the URL should be identified as being trustworthy based on a similarity between the URL received from the seller and the actual URL, wherein the seller is identified as being trustworthy using a reliability score that is based in part on an amount that the seller is identified as a trusted seller or an untrusted seller.

\* \* \* \* \*